(12) United States Patent
Ito

(10) Patent No.: US 9,776,681 B1
(45) Date of Patent: Oct. 3, 2017

(54) MOTORCYCLE

(71) Applicant: KAWASAKI JUKOGYO KABUSHIKI KAISHA, Kobe-shi, Hyogo (JP)

(72) Inventor: Koji Ito, Himeji (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 15/495,704

(22) Filed: Apr. 24, 2017

(30) Foreign Application Priority Data

Jun. 15, 2016 (JP) .................................. 2016-118425

(51) Int. Cl.
| | |
|---|---|
| B62K 11/04 | (2006.01) |
| B62M 7/02 | (2006.01) |
| F02B 61/02 | (2006.01) |
| B60K 5/12 | (2006.01) |
| F02M 35/16 | (2006.01) |

(52) U.S. Cl.
CPC ............... *B62K 11/04* (2013.01); *B60K 5/12* (2013.01); *F02M 35/162* (2013.01)

(58) Field of Classification Search
CPC ........ B62K 11/04; B62K 19/06; B62K 19/20; B60K 5/12; B60K 5/1208; F02M 35/162; B62H 1/00
USPC ....................... 180/219, 228; 280/281.1, 274
See application file for complete search history.

(56) References Cited

U.S. PATENT DOCUMENTS

| | | | | |
|---|---|---|---|---|
| 5,390,758 | A  * | 2/1995 | Hunter ................. | B60K 5/1208 180/227 |
| 9,650,100 | B2 * | 5/2017 | Ishii ........................ | B62H 1/00 |
| 2006/0283650 | A1* | 12/2006 | Kawamura ............ | B62K 19/06 180/227 |
| 2013/0020781 | A1* | 1/2013 | Kishikawa ............. | B62K 19/20 280/281.1 |
| 2013/0154311 | A1* | 6/2013 | Keisuke ................. | B62K 19/06 296/205 |
| 2015/0136510 | A1* | 5/2015 | Naruoka ................. | B62M 7/02 180/219 |
| 2016/0107715 | A1* | 4/2016 | Ishida .................... | B62K 11/12 180/219 |

FOREIGN PATENT DOCUMENTS

JP           2015096364 A      5/2015

* cited by examiner

*Primary Examiner* — Tony H. Winner
(74) *Attorney, Agent, or Firm* — Alleman Hall Creasman & Tuttle LLP

(57) ABSTRACT

A motorcycle comprises a vehicle body frame including: a head pipe; a pair of main frames extending rearward from the head pipe to be apart from each other in a vehicle width direction; a cross member extending in the vehicle width direction and connecting rear end portions of the pair of main frames; and a pair of rear frames extending rearward from the cross member; and an engine connected to the pair of main frames, each of the pair of main frames includes a trellis section, and a single pipe section extending rearward from the trellis section and having a rear end joined to the cross member, the trellis section is provided with a first mount to which a front portion of a cylinder head is connected, and the single pipe section is provided with a second mount to which a rear portion of the cylinder head is connected.

5 Claims, 3 Drawing Sheets

MOTORCYCLE

CROSS-REFERENCE TO THE RELATED APPLICATION

This application claims priority to and the benefit of Japanese Patent Application No. 2016-118425 filed on Jun. 15 2016, the entire disclosure of which is incorporated herein by reference.

BACKGROUND OF THE INVENTION

Field of the Invention

The present invention relates to a motorcycle in which an engine is connected to a pair of right and left main frames extending rearward from a head pipe in such a manner that the main frames are spaced apart from each other in a vehicle width direction (rightward and leftward direction).

Description of the Related Art

Japanese Laid-Open Patent Application Publication No. 2015-96364 discloses a motorcycle including main frames with a trellis frame structure including a plurality of pipes coupled to each other.

It is considered that the number of pipes constituting the main frames is reduced to reduce the weight of the main frames. However, if the number of pipes is reduced, the stiffness of the main frames is decreased, and reinforcement members are needed. Under the circumstances, there is a limitation to reduction of the weight of the main frames.

SUMMARY OF THE INVENTION

In view of the above-described circumstances, an object of the present invention is to provide a motorcycle which can realize reduction of the weight of main frames while securing the stiffness of the main frames.

According to a first aspect of the present invention, a motorcycle comprises a vehicle body frame including: a head pipe; a pair of main frames extending rearward from the head pipe in such a manner that the pair of main frames are spaced apart from each other in a vehicle width direction of a vehicle body; a cross member extending in the vehicle width direction and connecting rear end portions of the pair of main frames to each other; and a pair of rear frames extending rearward from the cross member and supporting a seat; and an engine connected to the pair of main frames, each of the pair of main frames includes a trellis section including a plurality of pipes coupled to each other in a trellis form, and a single pipe section extending rearward from the trellis section and having a rear end joined to the cross member, the trellis section is provided with a first mount to which a front portion of a cylinder head of the engine is connected, and the single pipe section is provided with a second mount to which a rear portion of the cylinder head of the engine is connected.

In accordance with the above-described configuration, since each of the main frames includes the trellis section and the single pipe section, the weight of the main frames can be reduced. Since the cylinder head connected to the first mount of the trellis section is connected to the second mount of the single pipe section, the stiffness of the single pipe sections can be improved by making use of the engine as a stiff member without use of additional reinforcement members. This makes it possible to suitably reduce the weight of the main frames and secure the stiffness of the main frames.

The motorcycle may further comprise: a throttle device which supplies intake air to the engine, and the single pipe section may be located outward of the throttle device in the vehicle width direction, and overlap with the throttle device in the vehicle width direction, when viewed from a side.

In accordance with this configuration, since the single pipe section is located outward of the throttle device in the vehicle width direction, and overlaps with the throttle device in the vehicle width direction, when viewed from the side, and a distance between the single pipe section and the cylinder head is short, the engine can more effectively reinforce the single pipe section.

The first mount may be connected to the front portion of the cylinder head via a first bracket with a pipe shape, and the second mount may be connected to the rear portion of the cylinder head via a second bracket with a plate shape having a normal line extending in the vehicle width direction.

In accordance with this configuration, the first bracket to which strong forces are transmitted in many directions has the pipe shape, while the second bracket which restricts a displacement of the single pipe section in the forward and rearward direction and in the vertical direction has the plate shape. In this configuration, the weight of the main frames can be suitably reduced without reducing the stiffness of the main frames.

The vehicle body frame may further include a pair of pivot frames extending downward from the cross member, each of the pair of pivot frames may be provided with a third mount to which a rear portion of a cylinder block of the engine is connected, and the third mount may be connected to the rear portion of the cylinder block via a third bracket with a plate shape having a normal line extending in the vehicle width direction.

In accordance with this configuration, the stiffness of the main frames can be indirectly increased. Since the third bracket which restricts a displacement of the single pipe section in the forward and rearward direction and in the vertical direction has the plate shape, the weight of the main frames can be suitably reduced without reducing the stiffness of the main frames.

The vehicle body frame may further include a pair of pivot frames extending downward from the cross member, each of the pair of pivot frames may be provided with a third mount to which a rear portion of a cylinder block of the engine is connected, the second mount may be connected to the rear portion of the cylinder head via a second bracket, the third mount may be connected to the rear portion of the cylinder block via a third bracket, and the second bracket may be shorter than the third bracket, when viewed from a side.

In accordance with this configuration, the single pipe section can be more effectively reinforced.

In accordance with the present invention, it becomes possible to provide a motorcycle which can reduce the weight of the main frames, and secure the stiffness of the main frames.

The above and further objects, features and advantages of the present invention will more fully be apparent from the following detailed description of preferred embodiments with reference to the accompanying drawings.

DETAILED DESCRIPTION OF THE EMBODIMENTS

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of a vehicle body of the motorcycle corresponds with a rightward and leftward direction.

[Overall Configuration of Motorcycle]

Figure 1:
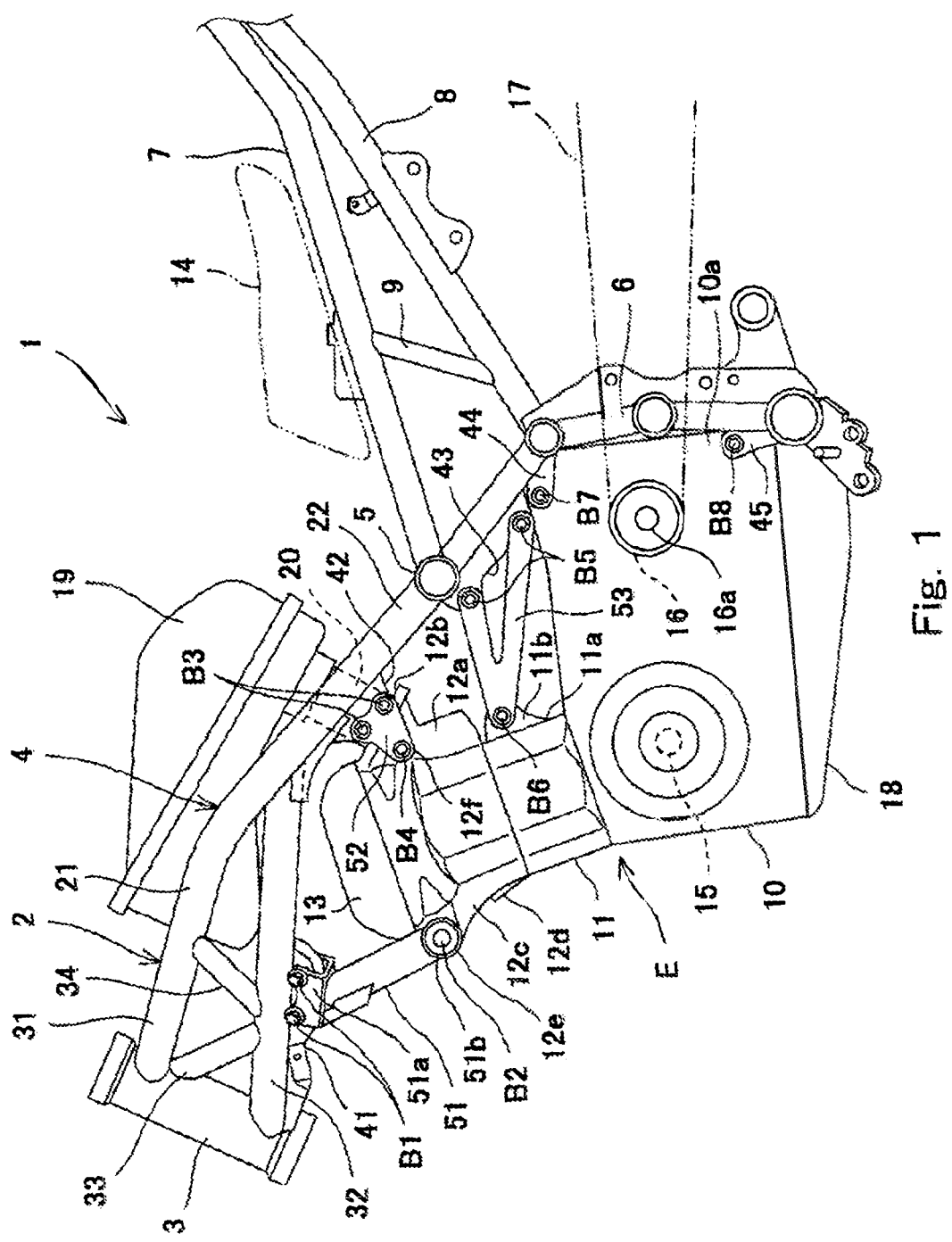
FIG. 1 is a side view of major constituents of a motorcycle according to an embodiment.
Figure 2:
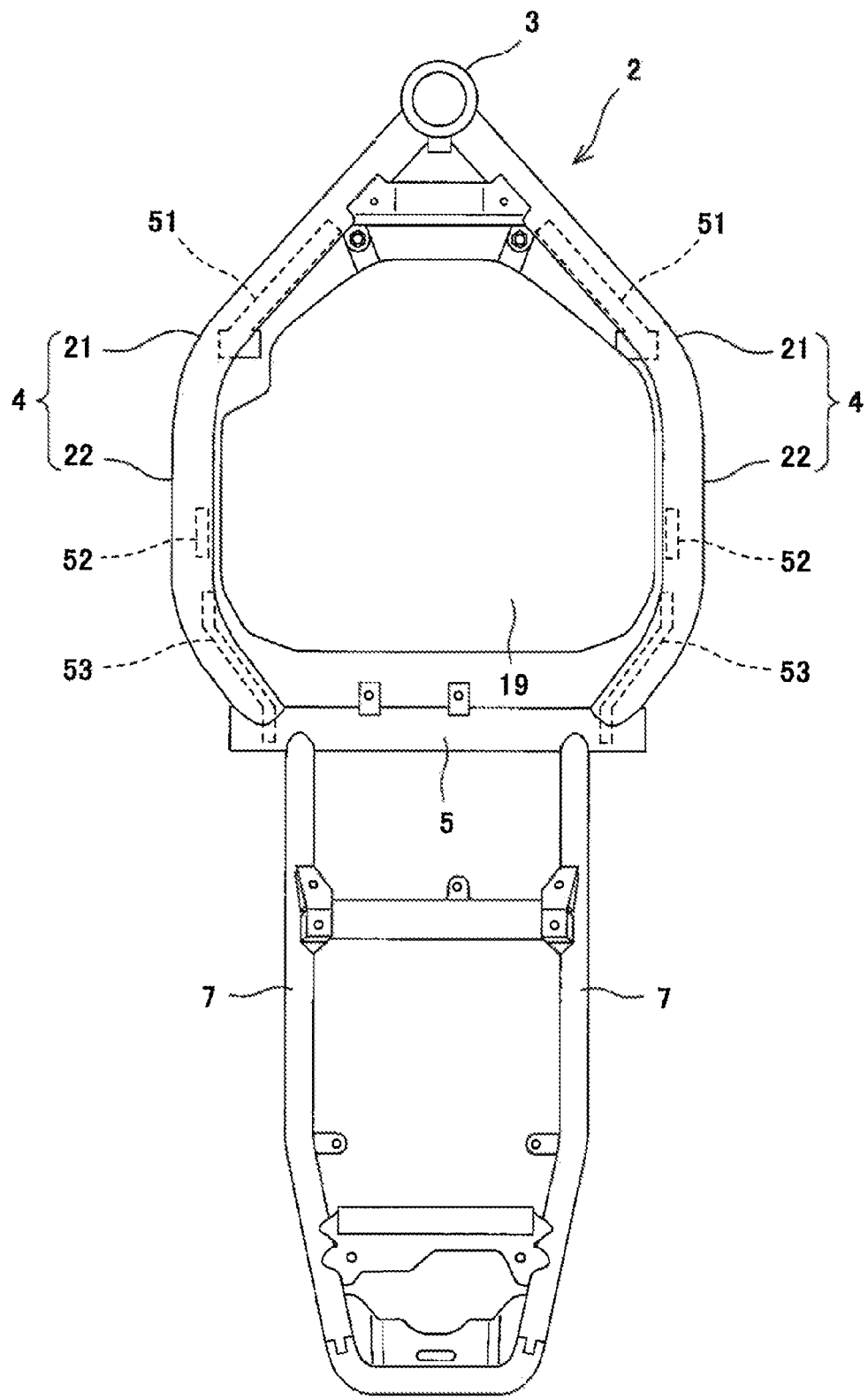
FIG. 2 is a plan view of the motorcycle of FIG. 1.
Figure 3:
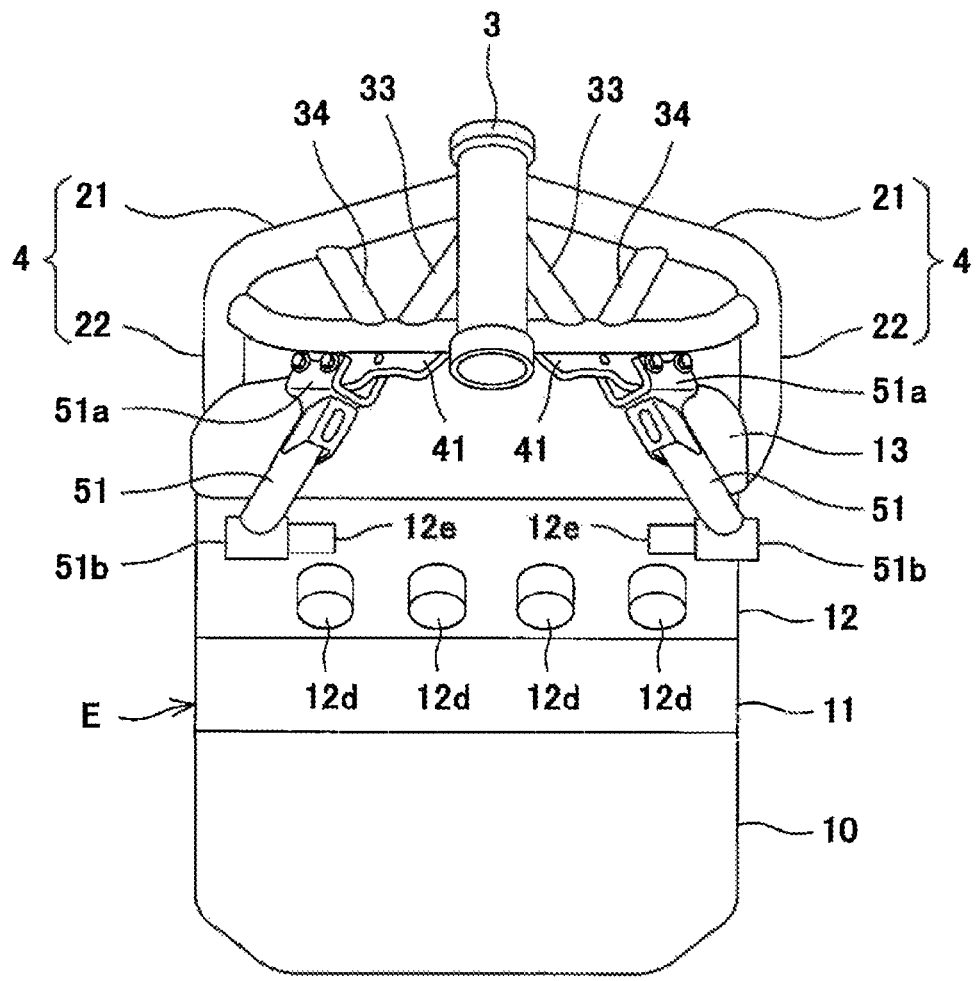
FIG. 3 is a front view of the motorcycle of FIG. 1.

FIG. 1 is a side view of major constituents of a motorcycle 1 according to an embodiment. FIG. 2 is a plan view of the motorcycle 1 of FIG. 1. FIG. 3 is a front view of the motorcycle 1 of FIG. 1. As shown in FIGS. 1 to 3, the motorcycle 1 includes a vehicle body frame 2, and an engine E mounted on the vehicle body frame 2. The vehicle body frame 2 includes a head pipe 3, a pair of right and left main frames 4, a cross member 5, a pair of right and left pivot frames 6, a pair of right and left rear frames 7, and a pair of right and left auxiliary rear frames 8.

The head pipe 3 supports a steering shaft in such a manner that the steering shaft is rotatable. The pair of right and left main frames 4 extend rearward from the head pipe 3 in such a manner that the main frames 4 are spaced apart from each other in the vehicle width direction (rightward and leftward direction). When viewed from the side, the pair of main frames 4 are disposed above the engine E not to overlap with the engine E. The cross member 5 extends in the vehicle width direction and connects the rear ends of the pair of main frames 4 to each other. The pair of pivot frames 6 extend downward from the cross member 5 in a state in which the pivot frames 6 are spaced apart from each other in the vehicle width direction. The pair of rear frames 7 extend rearward from the cross member 5 in a state in which the rear frames 7 are spaced apart from each other in the vehicle width direction.

The pair of rear frames 7 support a seat 14 which can be straddled by the rider. The pair of auxiliary rear frames 8 extend rearward from the pivot frames 6 at locations that are below the rear frames 7, respectively. The rear end portions of the auxiliary rear frames 8 are connected to the rear frames 7, respectively. The intermediate portions of the auxiliary rear frames 8 are connected to the rear frames 7, respectively, via reinforcement members 9.

The inline four-cylinder engine E is disposed below the main frames 4. The engine E includes a crankcase 10, a cylinder block 11, a cylinder head 12, and a cylinder head cover 13. A crankshaft 15, and a transmission 16 which changes the speed of driving power from the crankshaft 15 are accommodated in the crankcase 10. In other words, the crankcase 10 also functions as a transmission case for accommodating the transmission 16. The end portion of an output shaft 16a of the transmission 16 protrudes outward from the crankcase 10. Rotational driving power of the output shaft 16a is transmitted to a rear wheel (not shown) via a chain 17. An oil pan 18 which reserves oil therein is mounted on the lower portion of the crankcase 10.

The cylinder block 11 protrudes obliquely forward and upward from the front portion of the crankcase 10. A piston (not shown) is accommodated in the cylinder block 11. The piston is pushed down by combustion, and thereby the crankshaft 15 is rotated. The cylinder head 12 is connected to the cylinder block 11 from above. The cylinder head 12 protrudes obliquely forward and upward from the cylinder block 11 in such a manner that the cylinder head 12 and the cylinder block 11 extend along a common straight line. Inside the cylinder head 12, a combustion chamber is formed. A rear portion 12a of the cylinder head 12 is provided with four intake ports 12b aligned in the vehicle width direction. A front portion 12c of the cylinder head 12 is provided with four exhaust ports 12d aligned in the vehicle width direction. The cylinder head cover 13 is connected to the cylinder head 12 from above and covers members (e.g., a valve or a camshaft used to control air supply to the combustion chamber and exhaust gas discharge from the combustion chamber) provided at the upper portion of the cylinder head 12.

An air cleaner 19 is disposed above the engine E in such a manner that the air cleaner 19 overlaps with the cylinder head cover 13 when viewed from above (in a plan view). When viewed from above, the air cleaner 19 is disposed between the pair of main frames 4. The upper end of a throttle device 20 which supplies intake-air flowing from the air cleaner 19 to the engine E is connected to the air cleaner 19. The lower end of the throttle device 20 is connected to the intake ports 12b of the cylinder head 12. The air cleaner 19 is covered by a fuel tank (not shown) from above.

[Main Frame Structure]

Each of the pair of main frames 4 includes a trellis section 21 including a plurality of pipes which are coupled to each other in a trellis form, and a single pipe section 22 extending rearward from the trellis section 21, and constituted by a single pipe. Each of the pair of main frames 4 includes an upper frame 31 extending rearward from the upper portion of the head pipe 3, and a lower frame 32 extending rearward from the lower portion of the head pipe 3. One of the upper frame 31 and the lower frame 32 terminates at a location that is in front of the rear end of the other, and is joined to the intermediate portion of the other frame. In the present embodiment, the lower frame 32 terminates at a location that is in front of the rear end of the upper frame 31, and the rear end of the lower frame 32 is connected to the intermediate portion of the upper frame 31. The upper frame 31 and the lower frame 32 are coupled to each other by a plurality of gusset frames 33, 34. In this configuration, a portion of the upper frame 31 which is from its front end to the rear end of the lower frame 32, the lower frame 32, and the gusset frames 33, 34 constitute the trellis section 21 of a lattice shape.

A portion of the upper frame 31 which is from the rear end of the lower frame 32 to the rear end of the upper frame 31 is the single pipe section 22. The rear end of the single pipe section 22 is connected to the cross member 5. A pair of right and left single pipe sections 22 are spaced apart from each other in the vehicle width direction (rightward and leftward direction), at a location that is in front of the cross member 5, and are not coupled to each other. In other words, the pair of right and left single pipe sections 22 are free from each other at a location that is in front of the cross member 5, and not coupled to each other by a cross member.

A boundary between the trellis section 21 and the single pipe section 22, namely, the front end of the single pipe section 22 is located immediately above the cylinder head 12 when viewed from the side (in a side view). The front end of the single pipe section 22 is located immediately below the air cleaner 19 when viewed from the side. The single pipe section 22 is located outward of the throttle device 20 in the vehicle width direction, and overlaps with the throttle device 20 in the vehicle width direction, when viewed from the side. When viewed from the side, the front end of the single pipe section 22 is apart in a forward direction from the throttle device 20 and the rear end of the single pipe section 22 is apart in a rearward direction from the throttle device 20.

[Engine Mount Structure]

Each of the trellis sections 21 is provided with a first mount 41 to which a front portion 12c of the cylinder head 12 is connected. Each of the first mounts 41 protrudes in a plate shape in a downward direction from the front portion of the lower frame 32. Each of the first mounts 41 is connected to the front portion 12c of the cylinder head 12 via a first bracket 51 with a pipe shape. An upper end portion 51a of each of the first brackets 51 is fastened in the vehicle width direction to the first mount 41 by use of bolts B1. The front portion 12c of the cylinder head 12 is provided with fastening seat sections 12e protruding in a forward direction. The fastening seat sections 12e of the cylinder head 12 are located above the four exhaust ports 12d. A lower end portion 51b of each of the first brackets 51 is in contact with the fastening seat section 12e of the cylinder head 12 from an outer side in the vehicle width direction. The lower end portion 51b of each of the first brackets 51 is fastened in the vehicle width direction to the fastening seat section 12e of the front portion 12c of the cylinder head 12 by use of a bolt B2.

The lower end portions 51b of the first brackets 51 are located outward of the four exhaust ports 12d in the vehicle width direction. Each of the first brackets 51 is tilted in such a manner that the lower end portion 51b is located outward of the upper end portion 51a in the vehicle width direction. The pair of first brackets 51 are disposed apart at a great distance from each other in the vehicle width direction and are coupled to the cylinder head 12. When viewed from the front (in a front view), the pair of main frames 4, the pair of first brackets 51, and the cylinder head 12 constitute a trapezoidal shape in which an upper base is shorter than a lower base. Each of the first brackets 51 is tilted in such a manner that the lower end portion 51b is located rearward of the upper end portion 51a. When viewed from the side and the front, each of the first brackets 51 and the gusset frame 33 of the trellis section 21 are disposed on the same straight line.

Each of the single pipe sections 22 is provided with a second mount 42 to which a rear portion 12a of the cylinder head 12 is connected. Each of the second mounts 42 protrudes in a plate shape in a downward direction from the single pipe section 22. Each of the second mounts 42 is connected to the rear portion 12a of the cylinder head 12 via a second bracket 52 with a plate shape having a normal line extending in the vehicle width direction. The rear portion 12a of the cylinder head 12 is provided with fastening seat sections 12f at locations that are outward of four intake ports 12b in the vehicle width direction. When viewed from the side, each of the fastening seat sections 12f of the cylinder head 12 is disposed at a height position at which the fastening seat section 12f overlaps with the intake ports 12b, and located below the second mount 42.

Each of the second brackets 52 is fastened in the vehicle width direction to the second mount 42 by use of two bolts B3. Each of the second brackets 52 is fastened in the vehicle width direction to the fastening seat section 12f of the rear portion 12a of the cylinder head 12 by use of one bolt B4. When viewed from the side, each of the second brackets 52 has a substantially triangle shape. When viewed from the side, the two bolts B3 fastened to the second mount 42 overlap with the lower portion of the throttle device 20. The bolt B4 fastened to the fastening seat section 12f of the rear portion 12a of the cylinder head 12 is located rearward of the trellis section 21.

Each of the pivot frames 6 is provided with a third mount 43 to which a rear portion 11a of the cylinder block 11 is connected. Each of the third mounts 43 protrudes in a plate shape in a forward direction from the upper portion of the pivot frame 6. More specifically, each of the third mounts 43 protrudes in the forward direction from a region of the pivot frame 6 which is between the front end of the rear frame 7 and the front end of the auxiliary rear frame 8. Each of the third mounts 43 is connected to the rear portion 11a of the cylinder block 11 via a third bracket 53 with a plate shape having a normal line extending in the vehicle width direction. The rear portion 11a of the cylinder block 11 is provided with fastening seat sections 11b at locations that are outward of the four intake ports 12b in the vehicle width direction.

Each of the third brackets 53 is fastened in the vehicle width direction to the third mount 43 by use of two bolts B5. Each of the third brackets 53 is fastened in the vehicle width direction to the fastening seat section 11b of the rear portion 11a of the cylinder block 11 by use of one bolt B6. Each of the third brackets 53 has a shape in which a horizontal dimension is longer than a vertical dimension. When viewed from the side, each of the third brackets 53 has a substantially-V shape. The bolt B6 fastened to the fastening seat section 11b of the rear portion 11a of the cylinder block 11 is disposed between the two bolts B5 fastened to the third mount 43, in the vertical direction. The upper bolt B5 of the two bolts B5 fastened to the third mount 43 is closer to the cylinder block 11 than the lower bolt B5 is.

When viewed from the side, the second bracket 52 is shorter than the third bracket 53. A distance between each of the bolts B3 and the bolt B4, the bolts B3 and the bolt B4 being fastened to the second bracket 52, is shorter than a distance between each of the bolts B5 and the bolt B6, the bolts B5 and the bolt B6 being fastened to the third bracket 53. When viewed from above (in a plan view), the first to third brackets 51 to 53 are disposed to overlap with the main frames 4.

Each of the pivot frames 6 is provided with a fourth mount 44 and a fifth mount 45 to which a rear portion 10a of the crankcase 10 is connected. Each of the fourth mounts 44 protrudes in the forward direction from a portion of the pivot frame 6, corresponding to the front end of the auxiliary rear frame 8. Each of the fifth mounts 45 protrudes in the forward direction from the lower portion of the pivot frame 6. Each of the fourth mounts 44 is fastened in the vehicle width direction to the rear portion 10a of the crankcase 10 by use of a bolt B7, and each of the fifth mounts 45 is fastened in the vehicle width direction to the rear portion 10a of the crankcase 10 by use of a bolt B8. It should be noted that the vehicle body frame 2 is not provided with a down frame extending downward from the head pipe 3, and the front portion of the crankcase 10 is not fastened to the vehicle body frame 2.

In accordance with the above-described configuration, since each of the main frames 4 includes the trellis section 21 and the single pipe section 22, the weight of the main frames 4 can be reduced. Since the cylinder head 12 connected to the first mounts 41 of the trellis sections 21 is connected to the second mounts 42 of the single pipe sections 22, the stiffness of the single pipe sections 22 can be improved by making use of the engine E as a stiff member without use of additional reinforcement members. This makes it possible to suitably reduce the weight of the main frames 4 and secure the stiffness of the main frames 4. In particular, in the present embodiment, the engine E is the inline four-cylinder engine, and a dimension in the vehicle width direction of the main frames 4 tends to be increased. For this reason, the configuration of the present invention can be effectively used.

The single pipe sections 22 are located outward of the throttle device 20 in the vehicle width direction, and overlap with the throttle device 20 in the vehicle width direction, when viewed from the side, and a distance between the single pipe sections 22 and the cylinder head 12 is short. In this way, the engine E can more effectively reinforce the single pipe sections 22.

Since the head pipe 3 supports the steering shaft to which the front forks supporting the front wheel and a front wheel brake are coupled in such a manner that the steering shaft is rotatable, the weight of the straddle-type vehicle 1, the rider, the rider's belongings, and the like is exerted on the head pipe 3. Also, for example, while the straddle-type vehicle 1 is turning in a state in which the front wheel is steered and the vehicle body is banked, or is decelerated by braking, a load is exerted on the head pipe 3. The first brackets 51 to which strong forces are transmitted from the head pipe 3 in many directions have the pipe shape. In contrast, the second brackets 52 which restrict a displacement of the single pipe sections 22 in the forward and rearward direction and in the vertical direction have the plate shape. In this configuration, the weight of the main frames 4 can be suitably reduced without reducing the stiffness of the main frames 4. The second brackets 52 with the plate shape are more easily bent in a compression direction than the first brackets 51 with the pipe shape are, and have a stiffness higher than that of the first brackets 51 with the pipe shape in a pulling direction. Therefore, space saving in the vehicle width direction and reduction of the weight of the main frames 4 can be realized. Further, since the second brackets 52 are shorter than the third brackets 53, the single pipe sections 22 can be more effectively reinforced.

Since the rear portion 11a of the cylinder block 11 of the engine E is connected to the third mounts 43 of the pivot frames 6 via the third brackets 53, the stiffness of the main frames 4 can be indirectly increased. Since the third brackets 53 which restrict a displacement of the single pipe sections 22 in the forward and rearward direction and in the vertical direction have the plate shape, the weight of the main frames 4 can be suitably reduced without reducing the stiffness of the main frames 4. When viewed from the front, the pair of main frames 4, the pair of first brackets 51 and the cylinder head 12 constitute the trapezoidal shape, the stiffness of a region that is in the vicinity of the head pipe 3 to which strong forces are applied in many directions can be further increased.

The invention claimed is:

1. A motorcycle comprising:
    a vehicle body frame including:
        a head pipe;
        a pair of main frames extending rearward from the head pipe in such a manner that the pair of main frames are spaced apart from each other in a vehicle width direction of a vehicle body;
        a cross member extending in the vehicle width direction and connecting rear end portions of the pair of main frames to each other; and
        a pair of rear frames extending rearward from the cross member and supporting a seat; and
    an engine connected to the pair of main frames,
    wherein each of the pair of main frames includes a trellis section including a plurality of pipes coupled to each other in a trellis form, and a single pipe section extending rearward from the trellis section and having a rear end joined to the cross member,
    wherein the trellis section is provided with a first mount to which a front portion of a cylinder head of the engine is connected, and
    wherein the single pipe section is provided with a second mount to which a rear portion of the cylinder head of the engine is connected.

2. The motorcycle according to claim 1, further comprising:
    a throttle device which supplies intake air to the engine;
    wherein the single pipe section is located outward of the throttle device in the vehicle with direction, and overlaps with the throttle device in the vehicle width direction when viewed from a side.

3. The motorcycle according to claim 1,
    wherein the first mount is connected to the front portion of the cylinder head via a first bracket with a pipe shape, and
    wherein the second mount is connected to the rear portion of the cylinder head via a second bracket with a plate shape having a normal line extending in the vehicle width direction.

4. The motorcycle according to claim 1,
    wherein the vehicle body frame further includes a pair of pivot frames extending downward from the cross member,
    wherein each of the pair of pivot frames is provided with a third mount to which a rear portion of a cylinder block of the engine is connected, and
    wherein the third mount is connected to the rear portion of the cylinder block via a third bracket with a plate shape having a normal line extending in the vehicle width direction.

5. The motorcycle according to claim 1,
    wherein the vehicle body frame further includes a pair of pivot frames extending downward from the cross member,
    wherein each of the pair of pivot frames is provided with a third mount to which a rear portion of a cylinder block of the engine is connected,
    wherein the second mount is connected to the rear portion of the cylinder head via a second bracket,
    wherein the third mount is connected to the rear portion of the cylinder block via a third bracket, and
    wherein the second bracket is shorter than the third bracket, when viewed from a side.

* * * * *